(12) United States Patent
Akahori et al.

(10) Patent No.: US 6,423,205 B1
(45) Date of Patent: Jul. 23, 2002

(54) ELECTRIC DEIONIZATION APPARATUS

(75) Inventors: Masaji Akahori; Takayoshi Kawamoto; Syu Nakanishi; Shinzi Miura; Toru Akiyama, all of Tokyo; Takayuki Saito, Kanagawa; Kunio Fujiwara, Kanagawa; Satoshi Konishi, Kanagawa, all of (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/646,958

(22) PCT Filed: Mar. 19, 1999

(86) PCT No.: PCT/JP99/01391
§ 371 (c)(1),
(2), (4) Date: Oct. 27, 2000

(87) PCT Pub. No.: WO99/48820
PCT Pub. Date: Sep. 30, 1999

(30) Foreign Application Priority Data

Mar. 24, 1998 (JP) ............................. 10-093868
May 20, 1998 (JP) ............................. 10-153697

(51) Int. Cl.$^7$ ............................ C02F 1/40; B01D 61/48
(52) U.S. Cl. ........................................ 205/636; 205/635
(58) Field of Search ................................. 204/635, 636

(56) References Cited

U.S. PATENT DOCUMENTS

| 2,815,320 A | 12/1957 | Kollsman ................... 204/180 |
| 4,632,745 A | 12/1986 | Giuffrida et al. ........... 204/301 |
| 4,925,541 A | 5/1990 | Giuffrida et al. ........ 204/182.5 |
| 5,308,467 A | 5/1994 | Sugo et al. ................. 204/301 |
| 5,376,253 A | * 12/1994 | Rychen et al. .............. 204/301 |
| 5,512,173 A | 4/1996 | Uchino et al. .............. 204/632 |
| 5,738,775 A | 4/1998 | Nagai et al. ................. 204/632 |
| 6,090,258 A | * 7/2000 | Mirsky et al. .............. 204/636 |

FOREIGN PATENT DOCUMENTS

| JP | 33-1859 | 3/1958 |
| JP | 34-4681 | 6/1959 |
| JP | 4-71624 | 3/1992 |
| JP | 4-72567 | 11/1992 |
| JP | 5-64726 | 3/1993 |
| JP | 5-277344 | 10/1993 |
| JP | 6-7645 | 1/1994 |
| JP | 6-79268 | 3/1994 |
| JP | 7-100391 | 4/1995 |
| JP | 7-236889 | 9/1995 |
| JP | 8-192163 | 7/1996 |
| JP | 9-99221 | 4/1997 |

* cited by examiner

Primary Examiner—Arun S. Phasge
Assistant Examiner—Thomas H. Parsons
(74) Attorney, Agent, or Firm—Oblon, Spivak, McClelland, Maier & Neustadt, P.C.

(57) ABSTRACT

The object of this invention is to provide an electrical deionization apparatus with which various feed water types ranging from water of high ion concentration to water of low ion concentration can be consistently deionized with high efficiency. At least part of cation-exchange membranes and anion-exchange membranes alternate between electrodes to form an alternating array of deionization and concentration compartments and the deionization compartment contains a woven or non-woven fabric made of cation-exchange fiber that is placed on the cation-exchange membrane side in a face-to-face relationship with a woven or non-woven fabric made of anion-exchange fiber that is placed on the anion-exchange membrane side, with the passageway of feed water between the two woven or non-woven fabrics containing an ion-conducting spacer provided with an ion-exchanging capability.

16 Claims, 7 Drawing Sheets

ELECTRIC DEIONIZATION APPARATUS

BACKGROUND OF THE INVENTION

1. Field of the Invention

This invention relates to a deionization apparatus, more particularly to an electrical deionization apparatus capable of efficient and consistent deionization of water over a wide range of ion concentrations.

2. Discussion of the Related Art

In the technology of separating aqueous solutions into the solvent and the solute, separating the solute which accounts for only a small portion of the solution is theoretically more energy-saving than separating the major-component solvent, as is obvious to the skilled artisan.

This difference is also-reflected in methods of removing ions that are contained in small amounts in liquids and they can be classified into two groups, the first group being intended to remove the solvent water and comprising distillation and reverse osmosis, and the second group being for removing the solute ions and comprising ion exchange and electrodialysis.

Distillation is a method for causing changes in the phase of water by heating and cooling cycles, and reverse osmosis is a method for pressurizing water with a high-pressure pump so that it passes through a permeable membrane. Both methods are energy-intensive approaches.

Ion exchange is a method using an ion-exchange resin that causes selective exchange and adsorption of ions in liquids. In this method, acids or alkalis are used as a regeneralizer of the ion-exchange resin and must be handled with great care. The corrosion of the equipment and leakage due to the regeneralizer are other necessary considerations. Another requirement is the treatment of the liquid waste resulting from the regeneration step.

Electrodialysis uses an electrodialyzer in which cation-exchange membranes are alternated with anion-exchange membranes to make an alternate arrangement of concentration compartments and deionization compartments between electrodes. With a gradient in electrical potential used as the driving force, the ions in a liquid are separated by selective movement from the deionization compartment through the ion-exchange membranes into the concentration compartments. Although electrodialysis permits continuous operation without using any chemicals, its applicability has been limited for the following reasons: a current must be applied in an amount sufficient to transport the ions of interest; if the percent salt removal is to be increased, hardness components are prone to precipitate at the interface with the ion-exchange membrane, making it impossible to produce deionized water of high specific resistance (i.e., high purity); and if the feed solution has low ion concentration, a higher voltage is required to transport the ions.

Under these circumstances, it has generally been held that solutions of high salt concentrations can advantageously be deionized by reverse osmosis, solutions of lower salt concentrations by electrodialysis, and solutions of even lower salt concentrations by ion exchange.

An electrical regenerable deionization apparatus and method that fills an ion exchanger between ion-exchange membranes in the deionization compartment of an electrodialyzer and which enables more efficient deionization to yield products of higher purity than achievable by the conventional electrodialysis method was first proposed by Paul Kollsman (Japanese Patent Publication Nos. 1859/1958 and 4681/1959). However, for more than 25 years after his proposal, no reliable apparatus of this model has been offered for operation on a commercial scale.

Nevertheless, primarily being motivated by the improvements in the performance of ion-exchange membranes, the advances in pre-treatment methods, the demand of the industrial sector for a deionization apparatus that does not need complicated regeneralizing facilities, and a global concern for the saving of resources and energy, efforts have been constantly made to develop a practically feasible electrical deionization technology that fills the ion exchanger between ion-exchange membranes and many salient improvements have been proposed in recent years.

Some of these improvements are commercially applicable and include the following: a method in which the deionization compartment is limited in terms of structural parameters such as width and thickness and filled with a mixture of cation- and anion-exchange resins (Japanese Patent Publication No. 72567/1992); a method in which the interior of the deionization compartment is segmented and filled with anion- and cation-exchange membranes alternately (Japanese Patent Public Disclosure No. 71624/1992); a method in which the deionization compartment is filled with a mixture of cation-exchange fiber, anion-exchange fiber and inactive synthetic fiber (Japanese Patent Public Disclosure No. 236889/1995); a method in which the deionization compartment is filled with a mixture of cation/anion-exchange resins and cation/anion-exchange fibers (Japanese Patent Public Disclosure No. 277344/1993); and a method in which a multi-core composite fiber of sea-island pattern having cation-exchange groups introduced therein is mixed with a multi-core composite fiber of the same pattern having anion-exchange groups incorporated therein and the mixture is shaped for filling (Japanese Patent Public Disclosure No. 192163/1996). These methods share the common feature of combining the mixed-bed ion-exchange resin technology (MB method) with electrodialysis.

However, all of these proposals have had difficulty in producing deionized water of high purity consistently over a prolonged time because they have one or more of the following problems: in order to prevent short-circuiting by the feed stream, the deionization compartment must be closely filled with the ion exchangers by a cumbersome procedure; due to the close filling, the pressure of the stream flowing into the deionization compartment must be held high; the variations in the flow of the water being fed into the deionization compartment may potentially disrupt the homogeneity of the mixed ion exchangers; ion-exchange resins of a rigidly cross-linked structure may become disintegrated during service; since the oppositely charged ion exchangers arranged in the direction of ion migration retard the smooth transport of ions, the ion exchangers become gradually "loaded" as the operation proceeds, potentially resulting in incomplete deionization; the ion exchangers must be mixed uniformly by a cumbersome procedure; it is difficult to secure the strength of the shaped ion exchanger; it is cumbersome to control the porosity of the shaped ion exchanger; and it is difficult to clean the ion exchangers sufficiently to prevent the dissolution of organic carbon (TOC).

The structure of the conventional electrodialyzer is characterized in that the spacer secures the necessary passageway for the feed stream, that it can be operated at low in-flow pressure and that no ion exchangers that interfere with the movement of ions are provided in the direction of ion migration. Continued attempts have also been made to design an advanced type electrodialyzers by filling the deionization compartment with an ion-conducting spacer so that power consumption is reduced while retaining the advantageous features of that structure. Although several tens of percent of cut on power consumption has been demonstrated, those attempts could not reach the stage of commercialization because of the following reasons: due to the difficulty in controlling the chemical reaction involved in introducing ion-exchange groups into the spacer material, mass production of the spacer is difficult; it is also difficult to secure the strength of the spacer; difficulty is also encountered in suppressing the dissolution of TOC from the spacer. Particularly in the case where the deionization compartment is filled with the ion-conducting spacer alone in place of ion-exchange resins, the spacer which, as an ion exchanger, has a smaller surface area than the ion-exchange resins makes only insufficient contact with the ions in the deionization compartment and the water to be treated flows as if it "short-circuits" the interior of the deionization compartment, thus failing to be deionized with high efficiency. The group of advanced type electrodialyzers have had a strong need for a spacer that has comparable capabilities and strength to the heretofore commonly employed polypropylene or polyethylene diagonal net spacers, that has ion conductivity and that is suitable for use in apparatus of industrial scale. As far as the present inventors know, there has been no example of an electrical deionization apparatus in which a non-woven fabric having ion-exchange capabilities is combined with an ion conducting spacer.

FIG. 4 shows an example of the prior art electrical deionization apparatus filled with ion-exchange resins.

The electrical deionization apparatus shown in FIG. 4 comprises, in order from the cathode side, a cathode 1, an anion-exchange membrane 2, a concentration compartment 3, a cation-exchange membrane 4, a deionization compartment 5, an anion-exchange membrane 2', a concentration compartment 3', a cation-exchange membrane 4' and an anode 10, these being arranged in the order written. If necessary, a plurality of deionization compartments may alternate with a plurality of concentration compartments in a parallel array between the two electrodes. The deionization compartment 5 is filled with a mixture of cation- and anion-exchange resins. To operate the apparatus, voltage is applied between the anode 10 and the cathode 1 while, at the same time, water to be treated 11 is fed into the deionization compartment 5 and concentration water (feed water into concentration compartment) streams 14 and 14' are fed into the concentration compartments 3 and 3', respectively. When the water to be treated and the concentration water are thusly introduced, the cations and anions in the water are respectively attracted toward the cathode and anode; since cation-exchange membranes are selectively permeable to cations whereas anion-exchange membranes are only permeable to anions, the cations in the feed water (e.g., $Ca^{2+}$ and $Na^+$) undergo ion-exchange on the cation-exchange resin filled in the deionization compartment 5 and pass through the cation-exchange membrane 4 to enter the concentration compartment 3 whereas the anions (e.g., $Cl^-$, $SO_4^{2-}$, $HSiO_3^-$ and $CO_3^{2-}$) undergo ion-exchange on the anion-exchange resin in the deionization compartment 5 and pass through the anion-exchange membrane 2' to enter the concentration compartment 3'. On the other hand, the movement of anions from the concentration compartment 3 to the deionization compartment 5 and that of cations from the concentration compartment 3' to the deionization compartment 5 are blocked since cation-exchange membranes are not permeable to anions and anion-exchange membranes are not permeable to cations. As a result, product water 12 having its ion concentration lowered is obtained in the deionization compartment 5 and concentrate water streams 13 and 13' having increased ion concentrations are obtained in the concentration compartments 3 and 3'. In the deionization compartment, the ion concentration of water decreases as it flows down toward the bottom. In the neighborhood of the interface between different types of ion-exchange resins, water dissociates ($H_2O \rightarrow H^+ + OH^-$) to have the ion-exchange resin regenerated continuously, thus allowing for continuous trapping of ions in the deionization compartment.

In the deionization compartment 5, ions also move through the water being treated but most of them move through the ion-exchange resin of the same type (cations transfer through the cation-exchange resin and anions through the anion-exchange resin) and smooth ion transfer does not occur unless ion-exchange resins of the same type communicate in series with each other. As a result, the performance for ion removal is by no means consistent, nor is it sufficiently high that water of a purity comparable to that of water treated by RO (reverse osmosis) to remove hardness components can be continuously deionized to an even higher purity. It has also been difficult to treat filtered water having a higher ion concentration or deionize high-purity water of low ion concentration to produce ultra-pure water.

With a view to solving these problems, an improvement of the electrical deionization apparatus having an ion exchanger filled in the deionization compartment was proposed (see Japanese Patent Public Disclosure No. 99221/1997). The proposal concerned the use of a non-woven fabric (polymerized fiber) as the ion exchanger and a cation-exchange non-woven fabric and an anion-exchange non-woven fabric were placed in a face-to-face relationship, and spaced apart by a synthetic resin net that was used in the conventional electrodialyzer. The ion exchanger non-woven fabrics had ion-exchange groups concentrated at high density on the surface of fiber and, hence, were advantageous for trapping ions. When ion exchanger non-woven fabrics having a larger surface area than ion-exchange membranes were used, the efficiency of trapping ions as the feed water was passing through the deionization compartment could be considerably enhanced. What is more, in the proposed apparatus, the ion exchanger non-woven fabrics were in close contact with the ion-exchange membranes and, hence, the ions trapped on the ion exchanger non-woven fabrics could smoothly transfer to the ion-exchange membranes, through which they permeate to enter the concentration compartments.

With this apparatus, the feed water need not always be passed through a closely filled layer of ion exchanger, making it possible to lower the pressure loss, simplify the ion exchanger packing operation and reduce the complexity of the apparatus. As a result, an electric deionization apparatus could be realized that solved the various problems with the prior art and which was capable of maintaining the high purity of the product water over an extended period.

In fact, however, if one tries to perform further enhanced deionization of water using the proposed apparatus having the ion :exchanger non-woven fabrics and the synthetic resin net filled in the deionization compartment, the cathode-to-anode voltage is increased and more energy is consumed.

In particular, if one wants water quality comparable to ultra-pure water, the product water is substantially free of residual ions and, in areas close to the synthetic resin net, it becomes almost like an insulator and a very high voltage is needed to continue the operation; this is certainly an economic disadvantage from a facilities viewpoint.

The apparatus had another problem. As the ion concentration in the deionization compartment decreased, that of the concentrate water increased and the amount of ion diffusion due to the difference in ion concentration between the concentrate water and the deionized water (namely, the amount of ion transfer from the concentrate water to the deionized water) also increased to balance with the amount of ion transfer due to the potential difference (namely, the amount of ion transfer from the deionized water to the concentrate water). In order to obtain product water of high purity in that situation, the ion concentration in the concentration water had to be lowered.

It is known that the ion concentration in the concentration water that is appropriate for achieving efficient ion transfer is no more than 200 times, desirably no more than 100 times, the ion concentration in the product water. Therefore, if one wants to obtain ultra-pure water having a specific resistance on the order of 18 MΩ·cm, water deionized to a specific resistance of at least 5 MΩ·cm is desirably provided at the entrance for the concentration water.

On the other hand, if the ion concentration of the concentration water is lowered, the electrical resistance of the concentration compartment increases to consume more power. Therefore, in order to reduce power consumption, it was proposed to increase, rather than decrease, the ion concentration of the concentration water (see Japanese Patent Public Disclosure Nos. 24374/1997 and 290271/1997).

SUMMARY OF THE INVENTION

The present invention has been accomplished under these circumstances and has as an object providing an electrical deionization apparatus that can be operated at such low cathode-to-anode voltages that it finds extensive use in various applications ranging from the deionization of filtered water of high ion concentration to the production of ultra-pure water and which allows for an increase in capacity.

The present inventors conducted intensive studies in order to attain the stated object in connection with an electrical deionization apparatus that fills the deionization compartment with an ion exchanger consisting of ion-exchange woven fabrics or non-woven fabrics, with a cation-exchange woven or non-woven fabric being placed in a face-to-face relationship with an anion-exchange woven or non-woven fabric as they are spaced apart by a synthetic resin net. As a result of their studies, the present inventors found that the performance of the apparatus could be dramatically improved by functionalizing an ion-exchanging capability to the synthetic resin net so that it works as an ion-conducting spacer. The present invention has been accomplished on the basis of this finding.

Thus, the present invention relates to an electrical deionization apparatus in which at least part of cation-exchange membranes and anion-exchange membranes alternate between electrodes to form an alternating array of deionization and concentration compartments and the deionization compartment contains a woven or non-woven fabric made of cation-exchange fiber that is placed on the cation-exchange membrane side in a face-to-face relationship with a woven or non-woven fabric made of anion-exchange fiber that is placed on the anion-exchange membrane side, with the passageway of feed water between the two woven or non-woven fabrics containing an ion-conducting spacer provided with; an ion-exchanging capability.

The ion-exchange fiber to be used in the electrical deionization apparatus of the invention is preferably obtained by grafting ion-exchange groups to a substrate made of polymeric fiber. The substrate may consist of monofilaments of a single type of fiber; alternatively, it may consist of composite fiber having the core and the sheath made of different polymers. An example of the composite fiber that can be used is one having a core-sheath structure in which the sheath component is made of a polyolefinic polymer such as polyethylene and the sheath component is made of other polyolefinic polymer such as polypropylene. Ion-exchange groups may be introduced into such composite fiber material by radiation-induced graft polymerization and the product is preferred for use as an ion-exchange fiber material in the invention since it has high ion-exchanging performance and is available in uniform thickness.

To prepare the ion-conducting spacer for use in the invention, a diagonal net made of a polyolefinic high-molecular weight resin, for example, polyethylene conventionally used in electrodialyzers may be used as a substrate and subjected to radiation-induced graft polymerization to functionalize an ion-exchanging capability. The thus obtained product is preferred in the invention since it has high ion conductivity and allows for efficient distributing of the feed water.

In the deionization apparatus of the invention, the deionization compartment has preferably a thickness of 2.5–5 mm and the concentration compartment including an electrode compartment has preferably a thickness of 0.5–2.0 mm. Preferably, the deionization compartment and the concentration compartment are both composed of a frame member having conduits that permit the passage of feed water, product water and concentrate water, and a plurality of such deionization and concentration compartments are stacked to fabricate an electrical deionization apparatus.

If one wants product water whose quality is comparable to that of ultra-pure water (with a specific resistance of at least 18 MΩ·cm), pure water having a specific resistance of at least 5 MΩ·cm is supplied to the concentration compartment and, optionally into an electrode compartment. Such pure water is conveniently obtained by branching a portion of the product water at the exit thereof. If desired, two or more units of the electrical deionization apparatus of the invention may be connected in series such that the concentration compartment and the electrode compartment of a unit is supplied with the water that has passed through the concentration compartment and an electrode compartment of the subsequent unit, with the concentration compartment and an electrode compartment of the last unit being supplied with deionized water having a specific resistance of at least 5 MΩ·cm.

The preferred embodiments of the invention are described below with reference to the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

In FIGS. 1 and 2, numeral 1 represents a cathode, 2 and 2' anion-exchange membranes, 3 and 3' concentration compartments, 4 and 4' cation-exchange membranes, 5 a deionization compartment, 6 a non-woven fabric composed of cation-exchange fiber, 7 a non-woven fabric composed of anion-exchange fiber, 8 a deionization compartment spacer that is placed in the deionization compartment to provide the passageway of the feed water, 9 and 9' concentration compartment spacers that are placed in the concentration compartments to provide the passageways of the concentrate water, and 10 an anode. Numeral 11 represents the feed water, 12 the product water (deionized water), 13 and 13' effluent streams of water from the concentration compartments, and 14 and 14' the streams of concentration water being introduced into the concentration compartments.

DESCRIPTION OF THE INVENTION

Figure 1:
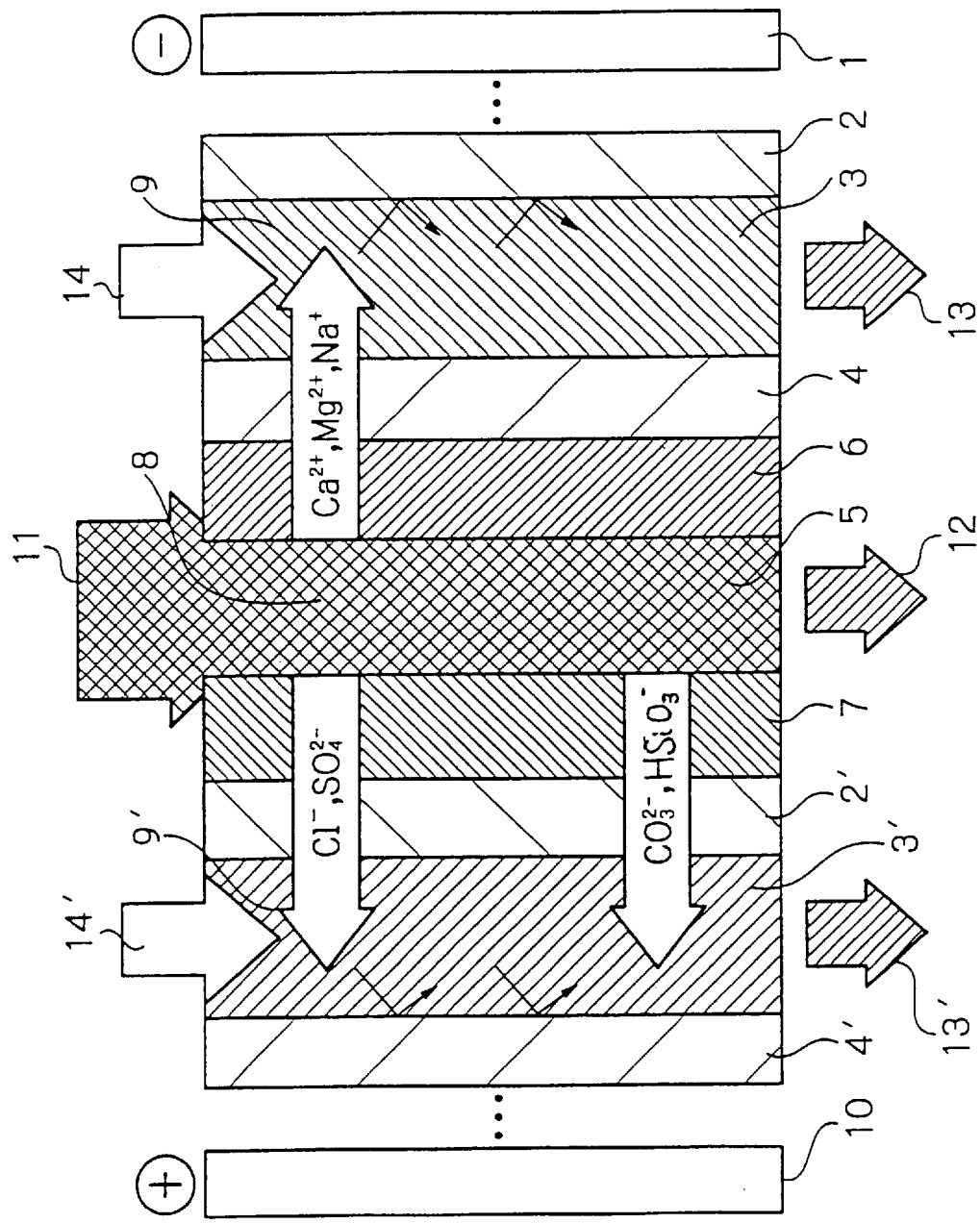
FIG. 1 shows schematically an electrical deionization apparatus according to an embodiment of the invention.

FIG. 1 shows schematically an electrical deionization apparatus according to an embodiment of the invention. In the embodiment shown, the cathode 1 and the anode 10 at opposite ends have between them the following components in the order written: anion-exchange membrane 2, concentration compartment 3, cation-exchange membrane 4, non-woven fabric 6 made of cation-exchange fiber, deionization compartment 5, non-woven fabric 7 made of anion-exchange fiber, anion-exchange membrane 2', concentration compartment 3', and cation-exchange membrane 4'. Depending on the need, the alternation of two sets of the cation-exchange membrane and anion-exchange membrane may be repeated in at least a part of the apparatus to provide a parallel array of two or more deionization compartment cells (pairs of one concentration compartment, deionization compartment and another concentration compartment). The ion-conducting spacer 8 is placed within the deionization compartment 5 to provide the passageway of the feed water. In FIG. 1, no electrode compartment is shown but, if desired, the concentration compartment that is the closest to an electrode may be used as an electrode compartment; alternatively, an independent electrode compartment may be provided adjacent the concentration compartment that is the closest to an electrode and in a position that is close enough to the electrode to contact it. If the concentration compartment that is the closest to an electrode is used as an electrode compartment, there is no need to provide an ion-exchange membrane on the side of said compartment closer to the electrode. The arrangement of ion-exchange membranes may be such that ion-exchange membranes of the same type succeed each other in at least a part of the apparatus.

Figure 2:
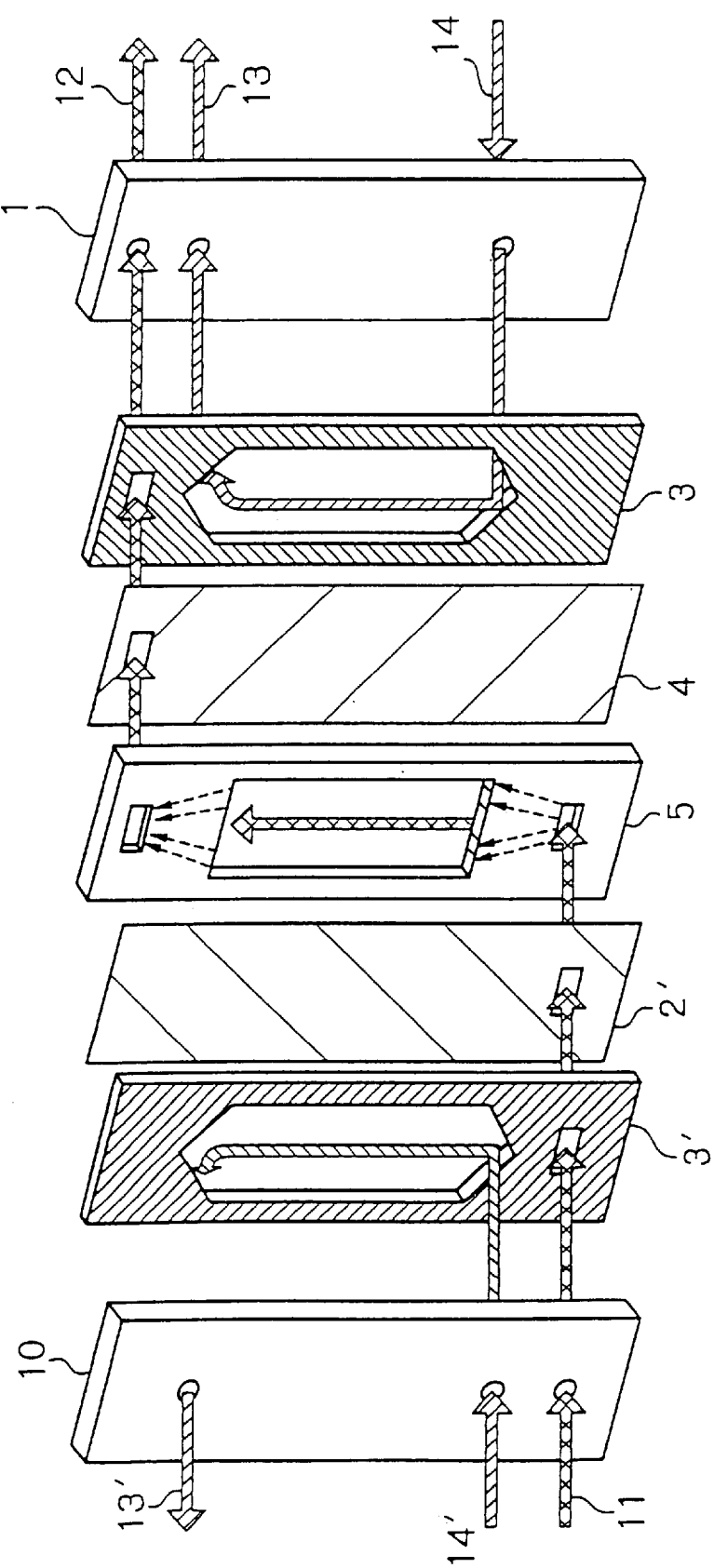
FIG. 2 is an exploded view of the same apparatus showing particularly its internal structure in the case of having only one deionization compartment (one-cell structure)

FIG. 2 shows the structures of the members that make up the electrical deionization apparatus of the invention which is shown schematically in FIG. 1. Note that the apparatus shown in FIG. 2 has only one deionization compartment cell. As mentioned in the previous paragraph, if the concentration compartment that is the closest to an electrode is used as an electrode compartment, there is no need to provide an ion-exchange membrane on the side of said compartment closer to the electrode; therefore, in the apparatus shown in FIG. 2, the concentration compartment on either side has no ion-exchange membrane provided on the electrode side. The structure of the deionization compartment 5 is shown specifically in FIG. 3; typically, two diagonal nets of spacer 8 that have been functionalized with an ion-exchanging capability are sandwiched between the cation-exchange non-woven fabric 6 and the anion-exchange non-woven fabric 7 and the assembly is fitted within the deionization compartment.

Figure 3:
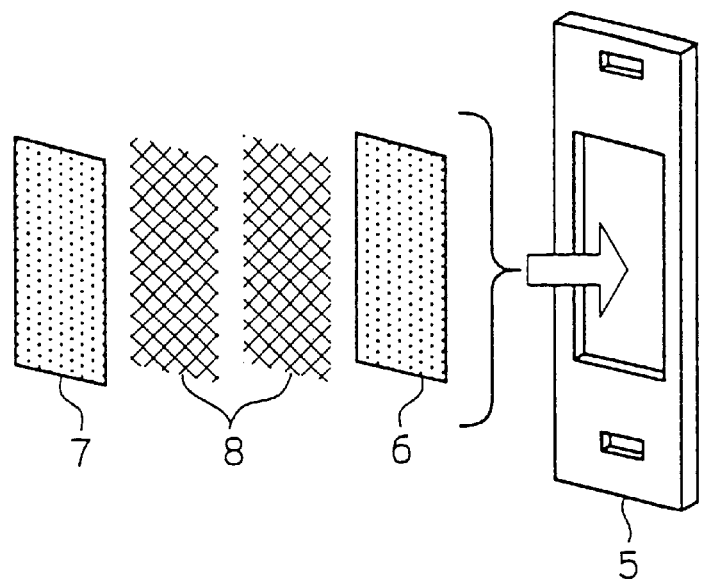
FIG. 3 is an exploded view of the deionization compartment showing its internal structure.
Figure 4:
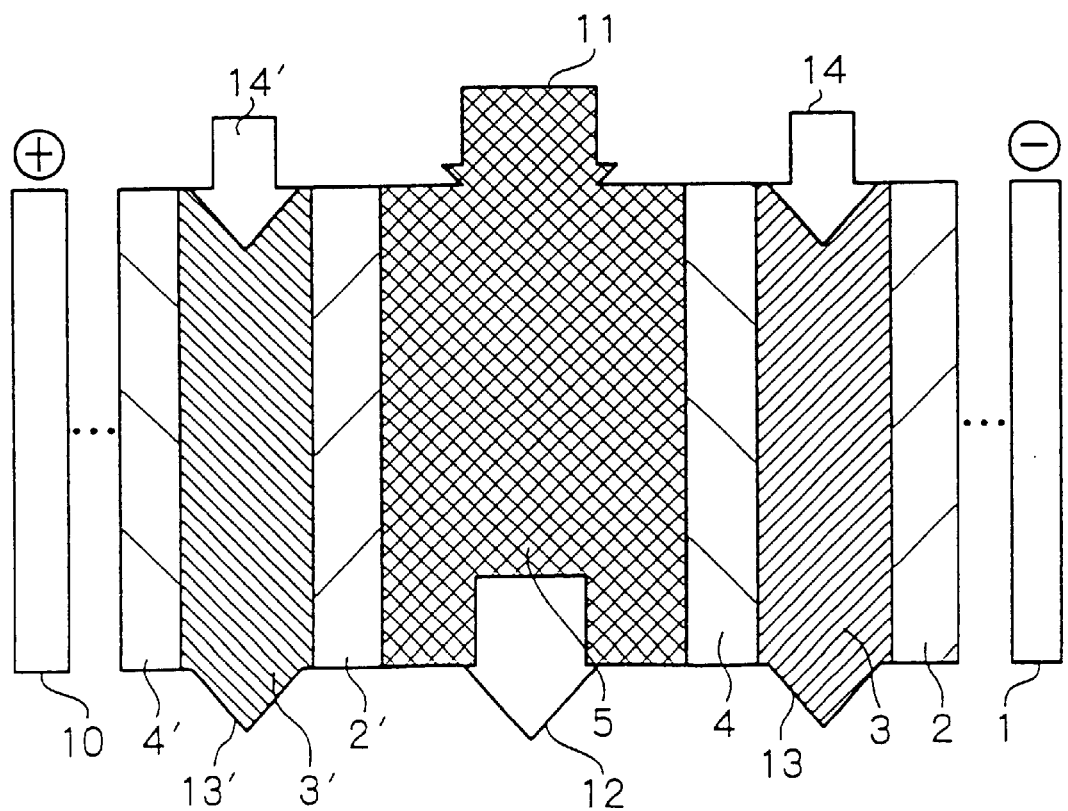
FIG. 4 is a schematic representation of a conventional electrical deionization apparatus.

Let us describe how the electrical deionization apparatus shown in FIGS. 1–3 according to an embodiment of the invention, is operated. First apply a dc voltage between the cathode 1 and the anode 10 and introduce the feed water 11 into the apparatus. Then, cations such as $Ca^{2+}$, $Mg^{2+}$ and $Na^{30}$ in the feed water undergo ion-exchange on the cation-exchange non-woven fabric 6 in the deionization compartment and driven by the electric field to transfer the cation-exchange non-woven fabric 6 and the cation-exchange membrane 4 to permeate the concentration compartment 3, from which it is discharged as the stream of concentrate water 13. On the other hand, anions such as $Cl^-$ and $SO_4^{2-}$ in the feed water undergo ion-exchange on the anion-exchange non-woven fabric 7 in the deionization compartment 5 and driven by the electric field,to transfer the anion-exchange non-woven fabric 7 and the anion-exchange membrane 2' to permeate the concentration compartment 3', from which it is discharged as the stream of concentrate water 13'. In the concentration compartment 3 (or 3'), the cations in the supplied stream of concentration water 9 (or 9') are attracted toward the cathode and the anions toward the anode; however, on account of the blocking ion-exchange membrane, they cannot permeate but remain as such in the concentrate water and are cleared in the concentrate water 13 (or 13').

Further referring to the electrical deionization apparatus of the invention, as the feed water 11 is distributed to pass through the deionization compartment 5 while forming, turbulent flows under the action of the diagonal net of spacer 8, the cations are trapped on the cation-exchange non-woven fabric 6 and the anions on the anion-exchange non-woven fabric 7. As a result, the ionic substances in the feed water 11 are removed with high efficiency to yield highly deionized product water 12.

As the deionization proceeds, less ions remain in the feed water, causing less current to flow through the product water. However, due to the ion-conducting spacer provided in the passageway of the feed water through the deionization compartment, the increase in the operating voltage can be considerably reduced. In addition, the ion trapping capability of the ion-conducting spacer contributes to a marked improvement in deionization factor. It has also been found that weakly dissociable carbonate, silica and other components that were difficult to remove with the conventional electrical deionization apparatus can be effectively removed. The deionization apparatus of the invention has also been found to have a surprising effect in that it can effectively remove the TOC that was difficult to remove not only by the conventional electrical deionization apparatus but also by the ion-exchange resin technology.

One or more ion-conducting spacers 8 may be placed within the deionization compartment. If desired, a cation-conducting spacer and an anion-conducting spacer that have different ion-exchanging capabilities may be used in any suitable combinations. By selecting suitable combinations in accordance with the quality of the water to be treated, deionization apparatus of various performance levels can be fabricated. To give an example, an anion-conducting spacer and a cation-conducting spacer may be placed adjacent the anion- and cation-exchange fibers, respectively, within the deionization compartment. It has been found in the experiments by the present inventors that incorporating one or more cation-conducting spacers alone in the deionization compartment is the most effective in lowering the operating voltage whereas the performance in removing anions including silica, carbonate and TOC can be improved by incorporating one or more anion-conducting spacers alone in the deionization compartment. However, no theory has yet been put forward to explain why those combinations are effective in lowering the operating voltage or improving the performance in anion removal. It can at least be postulated that in the presence of both cation and anion exchangers in the deionization compartment, sites of contact between different ion exchangers necessarily occur and water is dissociated at those sites, helping the ion exchangers in the deionization compartment to be regenerated.

In order to reduce the electrical resistance of the concentration compartment 3 and to suppress the elevation in the ion concentration on the surface of an ion-exchange membrane, another ion-conducting spacer is preferably placed in the concentration compartment 3. While either a cation-conducting spacer or an anion-conducting spacer may be applied, the former is preferred if one wants to suppress the elevation in the cation concentration on the surface of a cation-exchange membrane and the latter is preferred if one wants to suppress the elevation in the anion concentration on the surface of an anion-exchange membrane.

As in the concentration compartment, another ion-conducting spacer is desirably placed in an electrode compartment in order to reduce its electrical resistance. It is generally preferred to place a cation-conducting spacer in the cathode compartment made up by the cation-exchange membrane and the cathode; particularly in the case where one wants to suppress the concentration of cations on the cathode surface, a cation-conducting spacer may be placed on the cation-exchange membrane side whereas an anion-conducting spacer or a polyolefinic spacer into which no ion-exchange groups have been introduced is placed on the cathode surface: side and this is effective in suppressing the elevation in the ion concentrations on both the cation-exchange membrane surface and the cathode surface. Conversely, it is generally preferred to place an anion-conducting spacer in the anode compartment defined by the anion-exchange membrane and the anode; particularly in the case where one wants to suppress the concentration of anions on the anode surface, an anion-conducting spacer may be placed on the anion-exchange membrane side whereas a cation-conducting spacer or a polyolefinic spacer into which no ion-exchange groups have been introduced is placed on the anode surface side and this is effective in suppressing the elevation in the ion concentrations on both the anion-exchange membrane surface and the anode surface.

Providing an ion-conducting spacer not only in the deionization compartment but also in the concentration compartments and the electrode compartments offers an advantage in that even if concentration water having a very low ion concentration is used, the areas where the ion-conducting spacer is present become as if they had an increased ion concentration and the electrical resistance is correspondingly lowered to permit more electric current to flow. In addition, if the ion concentration in the concentration fluid is lowered, fewer ions diffuse from the concentration compartment to the deionization compartment and deionization proceeds at such a low voltage that the feed water can easily be deionized to an ion concentration close to the level for ultra-pure water. Further referring to the case of treating product water and concentrate water that have low ion concentrations, an increased amount of electric current flows in those areas where the ion-conducting spacer is present but the conduits and connected pipes have low ion concentrations and present such high electrical resistance that there will be no current leakage by way of the conduits and pipes; as a result, the current efficiency is increased and the safety of the apparatus is enhanced.

The electrical deionization apparatus of the invention operates on the principle that the water in the deionization compartment is: dissociated to produce $H^+$ and $OH^-$ ions, which regenerate the ion exchanger in the deionization compartment to allow for continued ion exchange. If no ion-conducting spacer is used in the concentration compartment, the generated $OH^-$ ions, as they permeate the anion-exchange membrane, move faster in the membrane than in the water to become concentrated on the boundary layer on the side of the anion-exchange membrane which faces the concentration compartment; the concentrated $OH^-$ ions react with hardness components such as Ca and Mg in the concentrate water to form precipitates such as $CaCO_3$ and $Mg(OH)_2$, making it difficult to continue the operation in a consistent manner. However, if an anion-conducting spacer is provided in the concentration compartment of the electrical deionization apparatus of the invention as mentioned above, the mobility of anions within the concentration compartment increases to restrain the increase in the concentration of $OH^-$ ions on the boundary layer of the anion-exchange membrane, thereby permitting consistent operation to be performed with greater ease.

If a fluid having low ion concentration equivalent to a specific resistance of 5 MΩ·cm or more is supplied as the concentration water, precipitates are less prone to form since the concentration water inherently contains small amounts of hardness components such as Ca and Mg.

Using the electrical deionization apparatus of the invention, deionized water having quality at least comparable to that of water treated by RO (reverse osmosis) to have a specific resistance of about 0.1 MΩ·cm or more can consistently be produced from filtered water having ion concentrations at the levels for city water (with a specific resistance of about 0.005 MΩ·cm or less), and high-purity water (having a specific resistance of about 15 MΩ·cm or more) from water of the quality comparable to that of RO treated water, and ultra-pure water (having a specific resistance of about 18 MΩ·cm or more) from the high-purity water. In addition, the apparatus consumes less power and, hence, can be constructed in a larger size.

In the electrical deionization apparatus of the invention, the non-woven fabrics and spacers are advantageously functionalized with ion-exchanging capabilities by grafting, preferably by radiation-induced graft polymerization. Radiation-induced graft polymerization is a technique by which a polymeric substrate is exposed to radiation to form radicals, which are reacted with a monomer so that it is introduced into the substrate.

A polyolefinic polymer, in particular, polyethylene is a common substrate for non-woven fabrics; a composite of polyethylene and polypropylene is particularly preferred but this is not the sole example that can be employed.

Substrates, for the spacer include polyolefinic polymers such as polyethylene and polypropylene. In the present invention, polyethylene is preferably used since it allows for easy radiation-induced graft polymerization.

The ion-exchange groups to be introduced into the substrates for non-woven fabrics and spacer are not limited in any particular way and various cation- and anion-exchange groups may be employed. Exemplary cation exchangers include those which contain cation-exchange groups such as a sulfonic group, a carboxyl group, a phosphoric group and a phenolic hydroxyl group, and exemplary anion exchangers include those which contain anion-exchange groups such as primary, secondary and tertiary amino groups and a quaternary ammonium group. Alternatively, ion exchangers containing both a cation- and an anion-exchange group may be employed.

Polymerizable monomers are grafted to the substrates for the non-woven fabrics and spacer to be used in the electrical deionization apparatus of the invention and they have either ion-exchange groups or groups that can be converted to ion-exchange groups. Monomers having ion-exchange groups may be exemplified by acrylic acid (AAc), methacrylic acid:, sodium styrenesulfonate (SSS), sodium methallylsulfonate, sodium allylsulfonate and vinylbenzyl-trimelthyl ammonium chloride (VBTAC) and these may be subjected to radiation-induced graft polymerization to introduce ion-exchange groups directly into the substrates. Monomers having groups that can be converted to ion-exchange groups include acrylonitrile, acrolein, vinylpyridine, styrene, chloromethylstyrene and glycidyl methacrylate (GMA). For example, glycidyl methacrylate may be introduced into the substrate by radiation-induced graft polymerization, then reacted with a sulfonating agent such as sodium sulfite to introduce sulfonic groups or aminated with diethanolamine or the like to produce ion-exchange non-woven fabrics or ion-conducting spacer.

When introducing cation-exchange groups, at least a sulfonic group is preferably introduced and when introducing anion-exchange groups, at least a quaternary ammonium group is preferably introduced. In the case of producing pure water, the pH of the feed water is in the neutral range and unless the ion-exchange group available is either a sulfonic group or a quaternary ammonium group that can dissociate even in this pH range, the operating voltage becomes so high that the deionization apparatus of the invention may occasionally fail to exhibit the intended performance. Needless to say, a carboxyl group which is a weakly acidic cation-exchange group, a tertiary amino group which is a weakly basic anion-exchange group and lower amino groups may also be present in the non-woven fabrics and spacer; however, in the case of non-woven fabrics, each of a sulfonic group and a quaternary ammonium group is preferably present in an amount of 0.5–3.0 meq/g in terms of salt splitting capacity and, in the case of spacer, each of these groups is preferably present in an amount of 0.5–2.0 meq/g in terms of salt splitting capacity. The ion exchange capacity can be adjusted by varying the graft ratio and the higher the graft ratio, the larger the ion exchange capacity.

The deionization compartment in the electrical deionization apparatus of the invention has preferably a thickness of 2.5–5 mm and considering the requirements for lower voltage and larger flow volume, a thickness of 3–4 mm is particularly preferred as proposed in Japanese Patent Public Disclosure No. 99221/1997, supra. The present inventors conducted many experiments on the deionization compartment that was filled with various kinds of ion-exchange non-woven fabrics and ion-conducting spacers. As a result, it was found that in order to produce treated water of satisfactory quality in a consistent manner, the substrate for non-woven fabrics should preferably have a thickness of 0.1–1.0 mm, an areal density of 10–100 g/m$^2$, a porosity of 50–98% and a fiber size of 10–70 $\mu$m whereas the substrate for spacer should preferably have a thickness of 0.3–1.5 mm.

A diagonal net is a preferred shape of the spacer to be filled in the deionization compartment and preferably in the concentration compartment, too, of the electrical deionization apparatus of the invention. The spacer should satisfy many conditions, among which the following are particularly important: the feed water should easily produce turbulent flows that are distributed randomly as it flows; the spacer should have sufficiently intimate contact with the ion-exchange fiber; the dissolution of unwanted substances and the generation of particles should be minimal; the pressure loss should be small; and the spacer should be in sufficient contact with the non-woven fabrics to prevent them from becoming deformed or compacted. An advantageous substrate that satisfies these conditions is a diagonal net of the type shown in FIG. 3 but this is not the sole example that can be employed. The thickness of the net is advantageously within the range of 0.3–1.5 mm since the flow volume of the feed water can be sufficiently increased to reduce the pressure loss. More than one spacer can be placed if the total thickness is within the stated range.

In the electrical deionization apparatus of the invention, the deionization compartment which preferably has a thickness of 2.5–5 mm is fitted with an assembly of the cation- and anion-exchange non-woven fabrics that are spaced apart by the ion-conducting spacer. Usually, the sum of the thicknesses of the respective members is greater than the thickness of the:deionization compartment. The thickness of each member can be determined appropriately considering various factors such as flow volume, pressure loss, the quality of feed water and voltage.

In the preferred embodiment of the invention, the same comment applies to the shape of the spacer to be loaded in the concentration compartment and the electrode compartment and the thickness of each member and these may be determined appropriately considering various factors such as flow volume, pressure loss and the dispersibility of the concentrate water.

In the electrical deionization apparatus of the invention, each of the deionization compartment and the concentration compartment including the electrode compartment is defined by a frame which is advantageously made of rigid poly(vinyl chloride), polyethylene or EPDM since these are,easily available, can be processed easily and have good shape stability. However, these are not the sole examples that can be used in the invention and any materials that are commonly used in the frames of electrodialyzers, known in the art may be employed.

Figure 10:
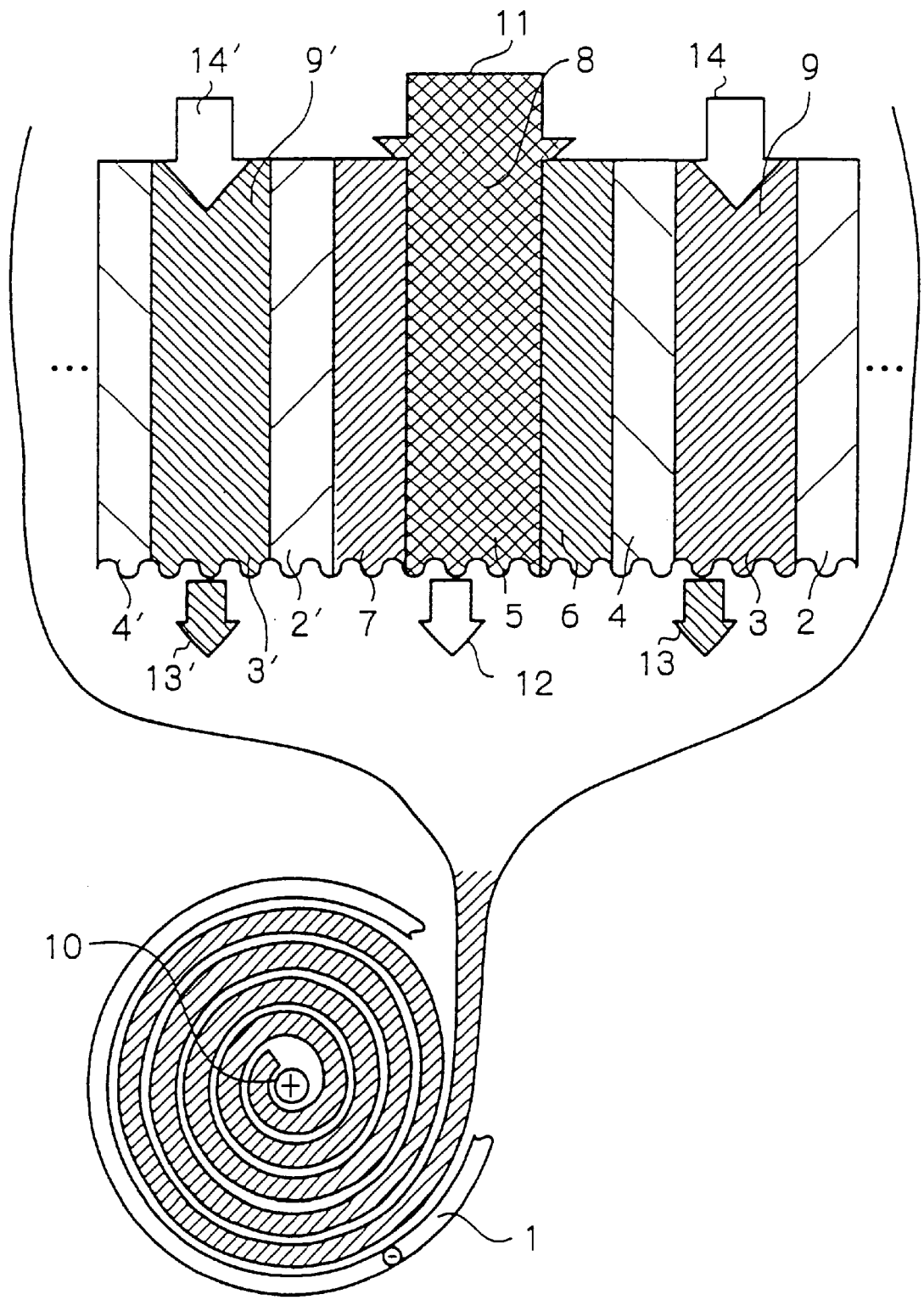
FIG. 10 shows in conceptual form the configuration of an electrical, deionization apparatus according to another embodiment of the invention.

The composition of the deionization apparatus according to the invention is typically shown in FIG. 1; one or more cells each consisting of a deionization compartment held between two concentration compartments are placed between electrodes at opposite ends, with each cell being composed of ion-exchange membranes, ion-exchange non-woven fabrics and an ion-conducting spacer. Another embodiment of the invention is shown in FIG. 10; sheets of ion-exchange membranes, ion-exchange non-woven fabrics and ion-conducting spacer are placed one on another to form a composite sheet member that comprises a cell consisting of a deionization compartment held between two concentration compartments; the composite sheet member is then wound onto an electrode into a cylindrical form, which is surrounded with the other electrode to fabricate a deionization unit. Needless to say, a plurality of ion-exchange membranes may be arranged to alternate with each other, thereby forming a sheet member having a plurality of deionization compartment cells in a parallel array. Thus, according to the second embodiment of the invention, cation-exchange membranes are alternated with anion-exchange membranes to form deionization compartments that alternate with concentration compartments, and a woven or non-woven fabric made of cation-exchange fiber is loaded in each deionization compartment such that it is placed on the cation-exchange membrane side in a face-to-face relationship with a woven or non-woven fabric made of anion-exchange fiber that is placed on the anion-exchange membrane side, and an ion-conducting spacer provided with an ion-exchanging capability is placed in the passageway of feed water between the two woven or non-woven fabrics to assemble a sheet member; the sheet member is then wound onto an electrode into a cylindrical form, which is surrounded with the electrode of other polarity, thereby completing the fabrication of an electrical deionization apparatus. In FIG. 10, the components which are identical to those of the deionization apparatus shown in FIG. 1 are identified by like numerals, except that the anode 10 is located in the center and the cathode 1 on the circumference.

EXAMPLES

The following examples are provided for the purpose of further illustrating the present invention but are in no way to be taken as limiting.

Example 1

Preparation of Ion-exchange Non-woven Fabric

Table 1 shows the specifications of the substrate non-woven fabric used in Example 1 to prepare an ion-exchange non-woven fabric. The substrate non-woven fabric was prepared by thermal fusion of composite fibers consisting of a polypropylene core and a polyethylene sheath.

TABLE 1

| Core/sheath | Polypropylene/polyethylene |
| --- | --- |
| Areal density | 50 g/m$^2$ |
| Thickness | 0.55 mm |
| Fiber diameter | 15–40 μm |
| Process | Thermal fusion |
| Porosity | 91% |

Preparation of Ion-conducting Spacer

Table 2 shows the specifications of the diagonal net used as the substrate for preparing an ion-conducting spacer in Example 1.

TABLE 2

| Constituent material | Polyethylene |
| --- | --- |
| Shape | Diagonal net |
| Thickness | 0.8 mm |
| Mesh opening | 6 mm × 3 mm |

One sample of the non-woven fabric identified in Table 1 was irradiated with γ-rays in a nitrogen atmosphere and then immersed in a solution of glycidyl methacrylate (GMA) for reaction. Graft ratio of 163% was obtained. Thereafter, the grafted non-woven fabric was immersed in a liquid mixture of sodium sulfite, isopropyl alcohol and water for sulfonation. Measurement of the ion-exchange capacity of the thus treated non-woven fabric showed that it was a strong acidic cation-exchange non-woven fabric having a salt splitting capacity of 2.82 meq/g.

Another sample of the same non-woven fabric was irradiated with γ-rays in a nitrogen atmosphere and thereafter immersed in a solution of chloromethylstyrene (CMS) for reaction and graft ratio of 148% was attained. The grafted non woven fabric was then immersed in an aqueous solution of 10% trimethylamine to introduce quaternary ammonium groups. The product was a strong basic anion-exchange non-woven fabric having a salt splitting capacity of 2.49 meq/g.

One sample of the diagonal net substrate identified in Table 2 was irradiated with γ-rays in a N$_2$ atmosphere and thereafter immersed in a liquid mixture of glycidyl methacrylate (GMA) and dimethylformamide (DMF) for reaction and graft ratio of 53% was obtained. The grafted net was then immersed in a liquid mixture of sodium sulfite, isopropyl alcohol and water for sulfonation. The product was a strong acidic cation-conducting spacer having a salt splitting capacity of 0.62 meq/g.

Another sample of the diagonal net substrate identified in Table 2 was irradiated under the same conditions as just mentioned above and immersed in a liquid mixture of vinylbenzyltrimethyl ammonium chloride (VBTAC), dimethyl acrylamide (DMAA) and water for reaction, and graft ratio of 36% was obtained. The product was a strong basic anion-conducting spacer having a salt splitting capacity of 0.44 meq/g.

Water Pass Test

Using the thus-prepared ion-exchange non-woven fabrics and ion-conducting spacers and commercial ion-exchange membranes, an electrical deionization apparatus of the construction shown in FIG. 1 was assembled. The commercial ion-exchange membranes were the cation- and anion-exchange membranes produced by Tokuyama Corp. and sold under the respective trade names, C66-10F and AMH. The assembled deionization apparatus had a parallel array of 11 deionization compartment cells of the structure shown in FIG. 1. Each deionization compartment measured 400×600 mm with a thickness of 3 mm and each concentration compartment was 0.8 mm thick. Each deionization compartment was loaded with one sheet of the cation-conducting spacer (see above) on the cation-exchange non-woven fabric side and also one sheet of the anion-conducting spacer (see above) on the anion-exchange non-woven fabric side. No ion-conducting spacer was loaded within the concentration compartments; instead, they each were loaded with a single sheet of polyethylene diagonal net that had not been subjected to graft polymerization.

Using this apparatus, a water pass test was conducted under the conditions set forth in Table 3. The product water (as obtained at the exit of each deionization compartment) had a consistent value of specific resistance at 17.0 MΩ·cm. The operating voltage was 360 V and the pressure loss was no more than 0.2 kg/cm$^2$.

TABLE 3

| Feed water | RO treated water |
| --- | --- |
| Specific resistance of feed water | ca. 0.35 MΩ · cm |
| Silica | 0.1–0.3 ppm |
| Water temperature | 14–20° C. |
| Flow volume | 1.0 m$^3$/h |

Comparative Example 1

A water pass test was conducted with the same apparatus as used in Example 1, except that the deionization compartments were filled with two spacers that were solely made of the substrate diagonal net (see Table 2) which was not subjected to graft polymerization and which hence had no ion conductivity. The quality of the product water was no better than 15 MΩ·cm in terms of specific resistance but he voltage between cells increased to 720 V.

Example 2

The ion-exchange membranes, ion-exchange non-woven fabrics and ion-conducting spacers that were of the same types as used in Example 1 were arranged in the same manner to assemble a deionization apparatus of the construction shown in FIG. 1. Eleven deionization compartment cells were formed. Using this deionization apparatus, a water pass test was conducted under the conditions shown in Table 4. The feed water was tap water that was freed of organic matter and iron by the combination of adsorption on activated charcoal, microfiltration (MF) and treatment with a nano-filter (NF). The product water had specific resistances of 3–3.5 MΩ·cm.

TABLE 4

| Feed water | Filtered water |
| --- | --- |
| Electroconductivity of feed water | 160–230 µS/cm |
| Water temperature | 12–18° C. |
| Flow volume | 0.5 m$^3$/h |

Example 3

Using the ion-exchange non-woven fabrics, ion-conducting spacers and ion-exchange membranes that were of the same types as used in Example 1, an electrical deionization apparatus of the construction shown in FIG. 1 was assembled. The deionization compartments each measured 400×600 mm with a thickness of 3 mm. The concentration compartments each had a thickness of 1.5 mm. The assembled deionization apparatus had a parallel array of 11 deionization compartment cells of the configuration shown in FIG. 1. Each deionization compartment was loaded with one sheet of cation-conducting spacer on the cation-exchange non-woven fabric side and one sheet of anion-conducting spacer on the anion-exchange non-woven fabric side. Each concentration compartment was loaded with one sheet of 0.8 mm thick anion-conducting spacer on the anion-exchange membrane side and one sheet of 0.8 mm thick cation-conducting spacer on the cation-exchange membrane side.

Feed water was passed through this apparatus as in Example 1 under the conditions shown in Table 3. The product water had consistent values of specific resistance and TOC at 17.2 MΩ·cm and 28–35 ppb, respectively. The operating voltage was 240 V and the pressure loss was no greater than 0.3 kg/cm$^2$. The silica removal was also as high as 96%. The specific resistance of the product water could be controlled by controlling the voltage and current being applied.

Example 4

An 11-cell deionization unit was assembled as in Example 3, except that the outermost concentration compartments (on the electrode side) which served as anode and cathode compartments were loaded with a cation-conducting spacer (in the cathode compartment) and an anion-conducting spacer (in the anode compartment). Two such units were connected in series to build a deionization apparatus. The cathode compartments of 1.5 mm thick were each loaded with two sheets of cation-conducting spacer 0.8 mm thick and the anode compartments of 1.5 mm thick were each loaded with two sheets of anion-conducting spacer 0.8 mm thick.

Figure 7:
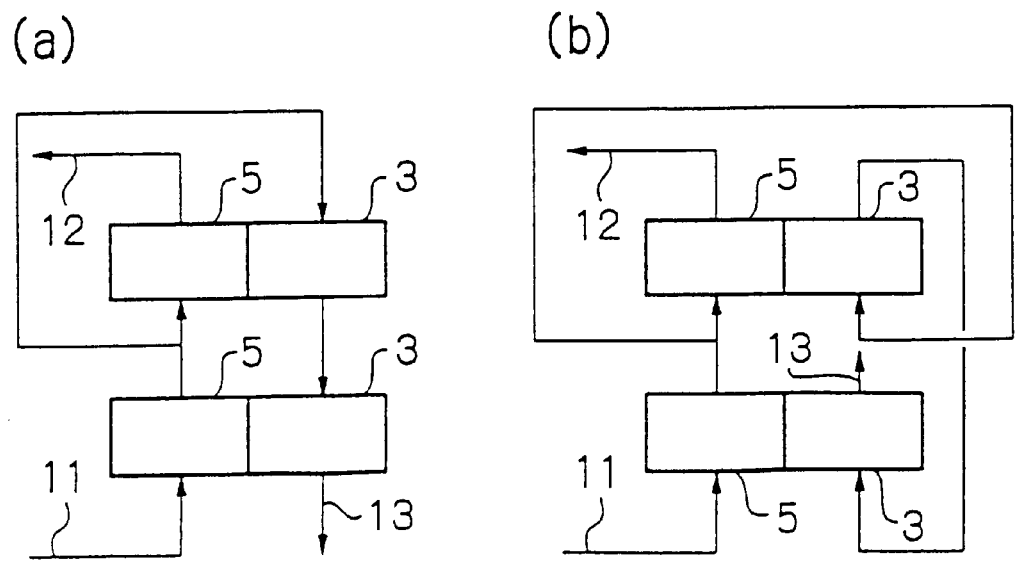
Figure 8:
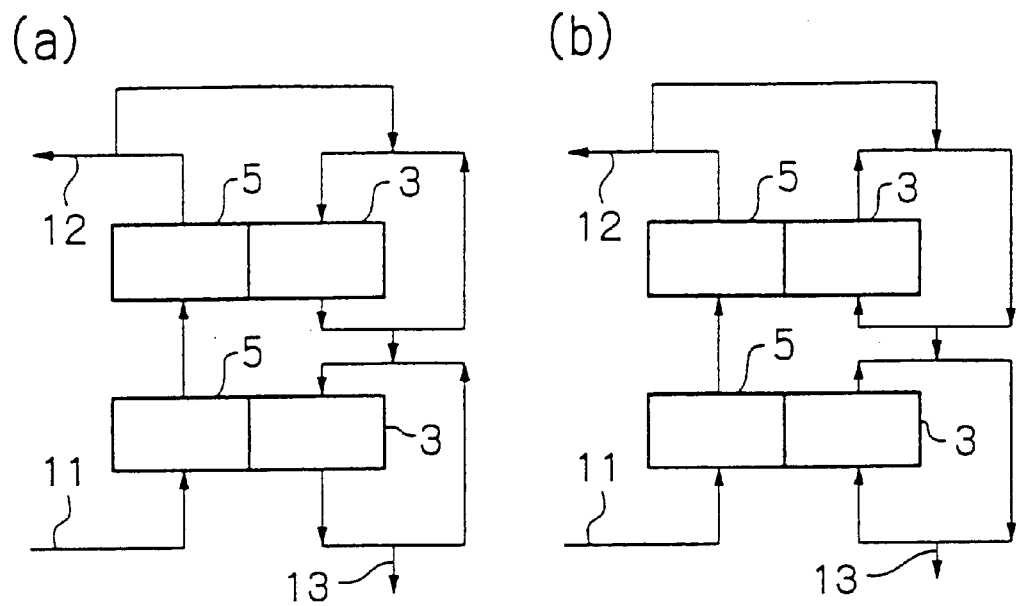
Figure 9:
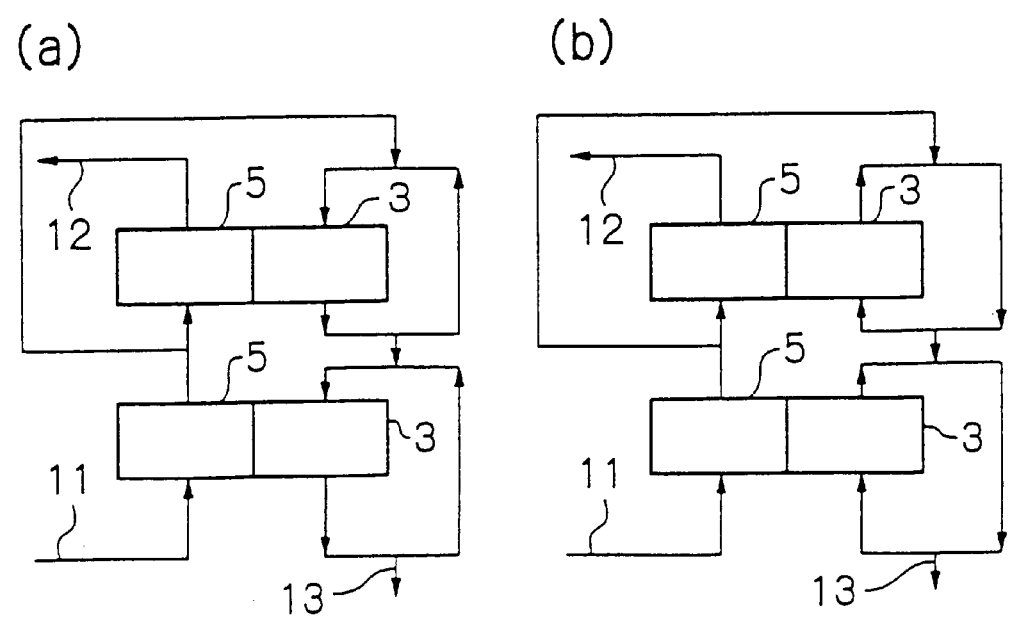

As shown in FIG. 7b, the product water exiting in a flow volume of 1.33 m$^3$/h from the deionization compartment 5 in the first-stage unit of the deionization apparatus was branched in a volume of 0.33 m$^3$/h and supplied into the concentration compartment 3 in the second-stage unit, the product water exiting from the concentration compartment 3 in the second-stage unit was supplied into the concentration compartment 3 in the first-stage unit, and the product water 13 exiting from the concentration compartment 3 in the first-stage unit was recovered into the supply tank to the RO apparatus.

Figure 5:
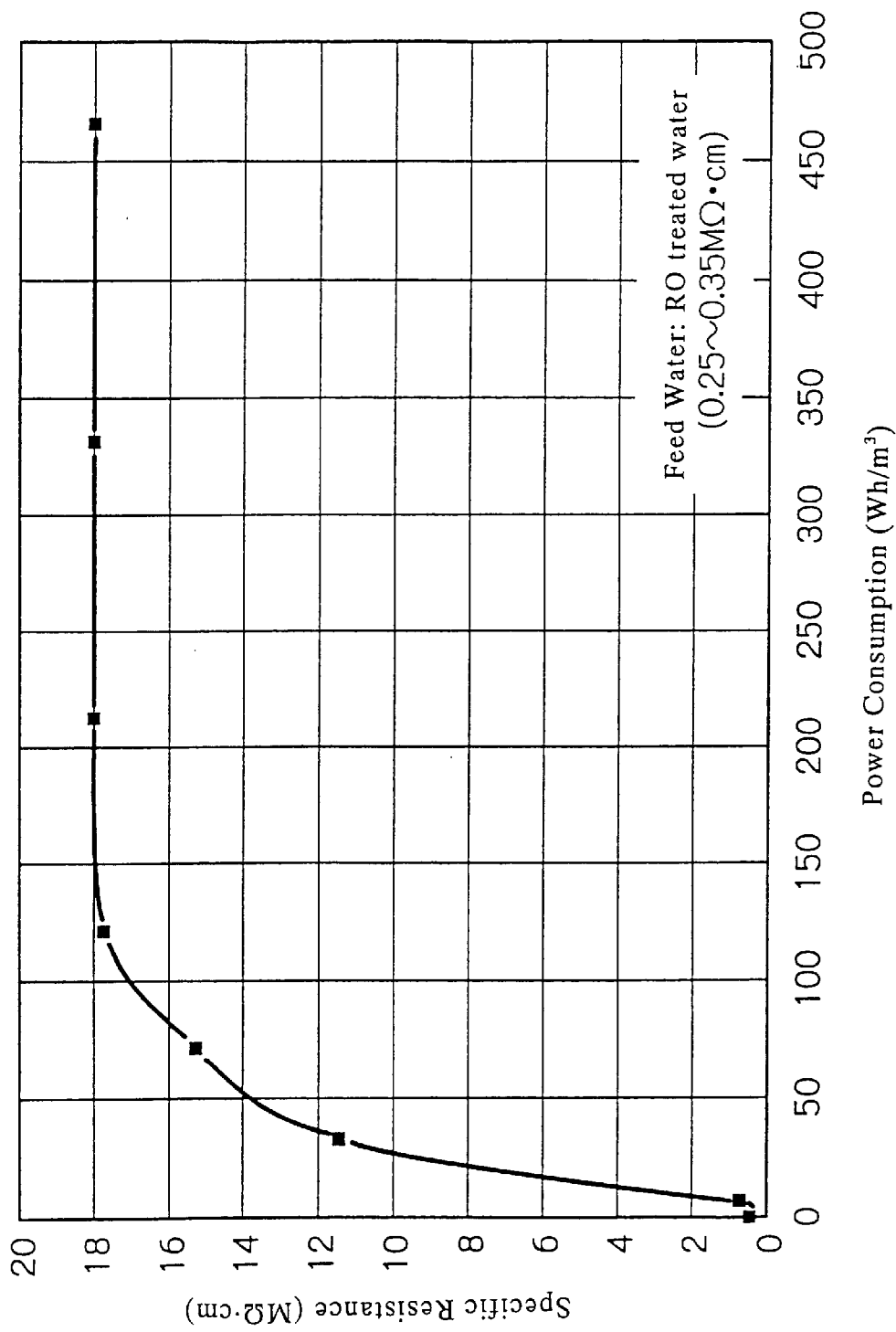
FIG. 5 shows the performance curve obtained when a water pass test was conducted in Example 4 using a deionization unit comprising two series-connected units of the electrical deionization apparatus of the invention.
Figure 6:
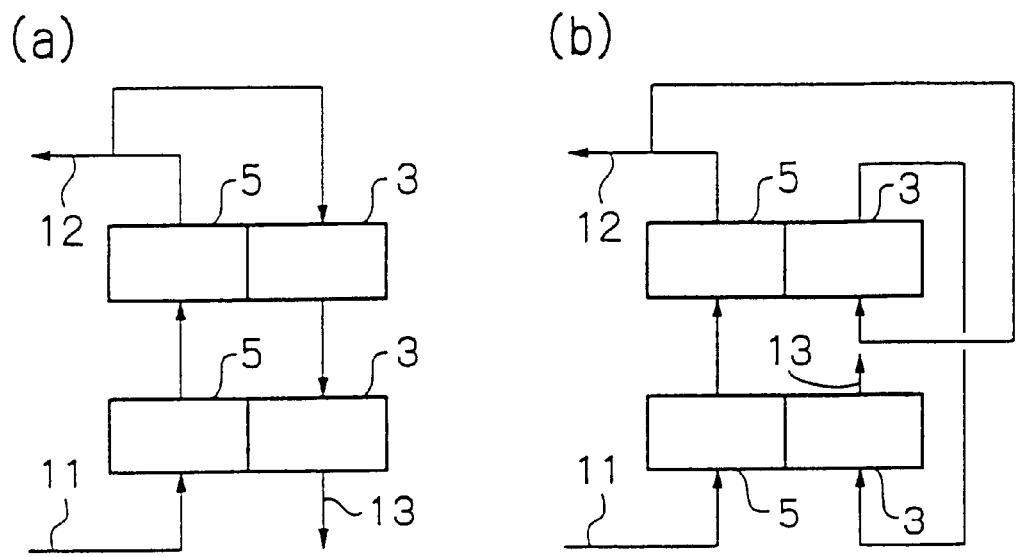
FIGS. 6–9 are flow diagrams showing how the stream of concentration water is feed to the respective units in a two-stage configuration of the deionization apparatus of the invention.

A water pass test was conducted as in Example 1 under the conditions set forth in Table 3 to give the performance curve shown in FIG. 5 which described the quality of the product water 12 from the deionization compartment in the second-stage unit as a function of the total power consumed by the two units. The product water 12 had a consistent TOC level at 10 ppb or less. The pressure loss through the two units was no more than 0.6 kg/cm$^2$. The silica removal was 99% or more for the total power consumption of 0.6 kWh/M$^3$.

FIGS. 6–9 are flow diagrams showing how the streams of deionization water and concentration water are supplied to the respective units in a two-stage configuration of the deionization apparatus. Each diagram labeled (a) refers to a counter-current system and each labeled (b) refers to a concurrent system. In FIGS. 6–9, the lower block designates the first-stage unit of deionization apparatus and the upper block the second-stage unit; numeral 5 refers to the deionization compartment; 3 is the concentration compartment; 11 is the feed water to the deionization compartment in the first-stage unit; 12 is the (deionized) product water exiting from the deionization compartment in the second-stage unit; 13 is the concentrate water being recirculated to the supply tank of the feed water. Thus, two units of the deionization apparatus of the invention may be series-connected in various circuits to implement the invention.

Example 5

Preparation of Ion-conducting Spacer

A diagonal net substrate (see Table 2) of the same type as used in Example 1 was irradiated with γ-rays in a nitrogen atmosphere and thereafter immersed in a liquid mixture of sodium styrenesulfonate (SSS), acrylic acid (AAc) and water for reaction, and graft ratio of 160% was obtained. Measurement of ion-exchange conductivity revealed the production of a strong acidic cation-conducting spacer having a salt splitting capacity of 1.05 meq/g.

Another sample of the same diagonal net substrate was irradiated with γ-rays in a nitrogen atmosphere and immersed in a liquid mixture of vinylbenzyltrimethyl ammonium chloride (VBTAC), DMAA and water for reaction, and a graft ratio of 130% was obtained. The product was a strong basic anion-conducting spacer having a salt splitting capacity of 0.82 meq/g.

Water Pass Test

Using the ion-exchange non-woven fabrics prepared in Example 1 and the ion-conducting spacers described above, an electrical deionization apparatus of the construction shown in FIG. 1 was assembled as in Example 4. The ion-exchange membranes were of the same types as used in Example 1. It consisted of two series-connected units each having 11 deionization compartment cells of the construction shown in FIG. 1. Each deionization compartment measured 400×600 mm with a thickness of 3 mm, and each concentration compartment had a thickness of 1.5 mm. Each deionization compartment was loaded with two sheets of the cation-conducting spacer (see above). Each concentration compartment was loaded with a 0.8 mm thick sheet of anion-conducting spacer on the anion-exchange membrane side and a 0.8 mm thick sheet of cation-conducting spacer on the cation-exchange membrane side.

Feed water was passed through this apparatus as in Example 4 under the conditions set forth in Table 3. The total power consumed by the two units was 0.15 kWh/M$^3$ and the product,water had consistent values of specific resistance and TOC at 17 MΩ·cm and 30 ppb or less, respectively. The pressure loss was as low as 0.6 kg/cm$^2$ or less. The silica, removal was also satisfactory at 90%. The specific resistance of the product water could be controlled by adjusting the voltage and current being applied.

Example 6

Using the ion-exchange non-woven fabrics and the ion-conducting spacers in Example 5, an electrical deionization apparatus of the :construction shown in FIG. 1 was assembled. The ion-exchange membranes were of the same types as used in Example 1. It consisted of two series-connected units each having 11 deionization compartment cells of the construction shown in FIG. 1. Each deionization compartment measured 400×600 mm with a thickness of 3 mm, and each concentration compartment had a thickness of 1.5 mm. Each deionization compartment was loaded with two sheets of the anion-conducting spacer (see above). Each concentration compartment was loaded with a 0.8 mm thick sheet of anion-conducting spacer on the anion-exchange membrane side and a 0.8 mm thick sheet of cation-conducting spacer on the cation-exchange membrane side.

Feed water was passed through this apparatus as in Example 4 under the conditions set forth in Table 3. The total power consumed by the two units was 0.3 kWh/m$^3$ and the product water had consistent values of specific resistance and TOC at 18.1 MΩ·cm and 5 ppb or less, respectively. The pressure loss was as low as 0.6 kg/cm$^2$ or less. The silica removal was also satisfactory at 99.5%. The specific resistance of the product water could be controlled by adjusting the voltage and current being applied.

INDUSTRIAL APPLICABILITY

According to the present invention, the deionization compartment of an electrical deionization apparatus is loaded with not only ion-exchange non-woven fabrics but also spacers provided with an ion-conducting capabilities. Compared to the conventional deionization apparatus, the apparatus of the invention is markedly improved in the quality of product water and reduced in power consumption and deionization can be performed in a higher efficiency, with smaller dissolution of unwanted matter, at a lower running cost and requiring a smaller installation space. With the electrical deionization apparatus of the invention, even ultra-pure water can be produced without chemicals but using only electrical energy. In a preferred embodiment of the invention, ion-conducting spacers are also loaded in the concentration compartment and this contributes to make a further improvement in performance. Another advantage of the electrical deionization apparatus of the invention is that product water of the desired quality can be obtained by merely changing the treatment conditions (electrical conditions).

What is claimed is:

1. An electrical deionization apparatus in which at least part of cation-exchange membranes and anion-exchange membranes alternate between electrodes to form an alternating array of deionization and concentration compartments and the deionization compartment contains a woven or non-woven fabric made of cation-exchange fiber that is placed on the cation-exchange membrane side in a face-to-face relationship with a woven or non-woven fabric made of anion-exchange fiber that is placed on the anion-exchanged membrane side, with the passageway of feed water between the two woven or non-woven fabrics containing an ion-conducting spacer provided with an ion-exchanging capability;

the electrical deionization apparatus wherein the ion-conducting spacer comprises a diagonal net substrate made of a polyolefinic high-molecular weight fiber into which ion-exchange groups have been introduced by radiation-induced graft polymerization.

2. The electrical deionization apparatus according to claim 1, wherein the passageway of feed water in the deionization compartment is loaded with a cation-conducting spacer on the cation-exchange non-woven fabric side and an anion-conducting spacer on the anion-exchange non-woven fabric side.

3. The electrical deionization apparatus according to claim 1, wherein the passageway of feed water in the deionization compartment is loaded with one or more cation-conducting spacers.

4. The electrical deionization apparatus according to claim 1, wherein the passageway of feed water in the deionization compartment is loaded with one or more anion-conducting spacers.

5. The electrical deionization apparatus according to clam 1, the passageway of concentrate water in the concentration compartment is loaded with an ion-conducting spacer: provided with an ion-exchanging capability.

6. The electrical deionization apparatus according to claim 5, wherein the passageway of concentrate water in the concentration compartment is loaded with a cation-conducting spacer on the cation-exchange membrane side and an anion-conducting spacer on the anion-exchange membrane side.

7. The electrical deionization apparatus according to claim 1, wherein an electrode compartment is formed between each electrode and the ion-exchange membrane adjacent said electrode.

8. The electrical deionization apparatus according to claim 7, wherein at least part of the passageway of the water flowing through each electrode compartment is loaded with an ion-conducting spacer provided with an ion-exchanging capability.

9. The electrical deionization apparatus according to claim 8, wherein the electrode compartment comprises an anode compartment and a cathode compartment, and at least part of the passageway of the water flowing through the anode compartment is loaded with an anion-conducting spacer and at least part of the passage.

10. The electrical deionization apparatus according to clam 1, wherein the concentration compartment adjacent each electrode defines an electrode compartment.

11. The electrical deionization apparatus according to claim 1, wherein the woven fabric or non-woven fabric made of ion-exchange fiber comprises a substrate made of polyolefinic high-molecular weight fiber into which ion-exchange groups have been introduced by radiation-induced graft polymerization.

12. The electrical deionization apparatus according to claim 11, wherein the woven fabric or non-woven fabric made of ion-exchange fiber is based on a composite fiber substrate that comprises a polypropylene core component and a polyethylene sheath component and into which sulfonic groups or quaternary ammonium groups have been introduced by radiation-induced graft polymerization.

13. The electrical deionization apparatus according to clam 1, wherein the deionization compartment and the concentration compartment are both composed of a frame member having conduits that permit the passage of feed water, product water and concentrate water, with a plurality of such deionization and concentration compartments being stacked to assemble the deionization apparatus.

14. The electrical deionization apparatus according to claim 1, wherein the concentration compartment is supplied with deionized water having a specific resistance of at least 5 MΩ·cm.

15. An electrical deionization apparatus in which at least part of cation-exchange membranes and anion-exchange membranes are alternated to form an alternating array of deionization and concentration compartments, and a woven or non-woven fabric made of cation-exchange fiber is loaded in each deionization compartment such that it is placed on the cation-exchange membrane side in a face-to-face relationship with a woven or non-woven fabric made of anion-exchange fiber that is placed on the anion-exchange membrane side, and an ion-conducting spacer provided with an ion-exchanging capability is installed in the passageway of feed water between the two woven or non-woven fabrics to assemble a sheet member, which is then wound onto an electrode into a cylindrical form and surrounds with the electrode of other polarity;

the electrical deionization apparatus wherein the ion-conducting spacer comprises a diagonal net substrate made of a polyolefinic high-molecular weight fiber into which ion-exchange groups have been introduced by radiation-induced graft polymerization.

16. The electrical deionization apparatus according to claims 1 or 15, wherein the ion conducting spacer comprises a diagonal polyethylene net substrata into which sulfonic groups or quaternary ammonium groups have been introduced by radiation-induced graft polymerization.

* * * * *